DEVICE FOR IMPARTING ROTATIONAL AND TRANSITIONAL MOVEMENTS TO PRODUCTS BEING TREATED IN THERMIC APPLIANCES

Filed Feb. 24, 1965 8 Sheets-Sheet 1

INVENTORS
MARGUERITE S. C. FROMONT,
MICHEL M. V. C. FROMONT
BY Stevens, Davis, Miller & Mosher
ATTORNEYS INVENTORS
MARGUERITE S. C. FROMONT,
MICHEL M. V. C. FROMONT
BY Stevens, Davis, Miller & Mosher
ATTORNEYS Jan. 2, 1968 M. S. C. FROMONT ETAL 3,361,418

DEVICE FOR IMPARTING ROTATIONAL AND TRANSITIONAL MOVEMENTS
TO PRODUCTS BEING TREATED IN THERMIC APPLIANCES

Filed Feb. 24, 1965 8 Sheets-Sheet 3

INVENTORS
MARGUERITE S. C. FROMONT,
MICHEL M. V. C. FROMONT
BY Stevens, Davis, Miller & Mosher
ATTORNEYS INVENTORS
MARGUERITE S.C. FROMONT,
MICHEL M.V.C. FROMONT
BY
Stevens, Davis, Miller & Mosher
ATTORNEYS INVENTORS
MARGUERITE S. C. FROMONT,
MICHEL M. V. C. FROMONT
BY Stevens, Davis, Miller & Mosher
ATTORNEYS INVENTORS
MARGUERITE S.C. FROMONT,
MICHEL M. V. C. FROMONT
BY Stevens, Davis, Miller & Mosher
ATTORNEYS INVENTORS
MARGUERITE S. C. FROMONT,
MICHEL M. V. C. FROMONT
BY *Stevens, Davis, Miller & Mosher*
ATTORNEYS INVENTORS
MARGUERITE S. C. FROMONT,
MICHEL M. V. C. FROMONT
BY Stevens, Davis, Miller & Mosher
ATTORNEYS

United States Patent Office 3,361,418
Patented Jan. 2, 1968

3,361,418

DEVICE FOR IMPARTING ROTATIONAL AND TRANSITIONAL MOVEMENTS TO PRODUCTS BEING TREATED IN THERMIC APPLIANCES

Marguerite S. C. Fromont and Michel M. V. C. Fromont, both of 2 Rue St. Leger Bat. C. 2, Saint Germain-en-Laye, France Filed Feb. 24, 1965, Ser. No. 434,857
Claims priority, application France, Mar. 3, 1964, 965,908; May 6, 1964, 973,464; May 15, 1964, 974,792; June 24, 1964, 979,448; Nov. 28, 1964, 996,720
21 Claims. (Cl. 263—6)

The present invention relates to a new and useful device for controlling the movement of material or products during operations carried out in thermic appliances.

The invention allows for transfer movements of products in a direction perpendicular to their greatest dimension or for rotary movement about an axis parallel to their greatest dimension to rotate the product so that each side is sequentially exposed to the thermic source. The movements may be adjusted to compensate for various shaped products in order to result in a preferred predetermined control of the product. At no time during the movements do the products undergo a hap-hazard or uncontrolled slide, fall or rotation, due, for example, to the sole action of gravity.

Various types of manipulation devices have been tried in attempts to obtain the rotation of products which are being treated at high temperatures. None of the existing devices allow for positive control for rotation of products having a substantially square or rectangular cross-section. In addition, the existing manipulation devices have the drawback of high cost and costly maintenance.

Therefore, an object of the present invention is to remedy the above drawbacks.

Another object of the present invention is to provide a means for imparting forward motion, with rotation, to steel products (slabs, ingots, billets) in continuous reheating furnaces, feeding rolling mills.

A further object of the present invention is to provide a manipulating means of the above mentioned type which may be readily and economically produced.

The movement of rotation is desirable in reheating applications in order to achieve more homogeneous temperature of the product thereby facilitating the working of the rolling mill. Further applications exist, for example in metallurgy industries, for the cooling of the ingots, after topping flow, by using rotation movements of products on cooling grates.

The existing furnace systems comprise hearths generally planar in shape with notches or saw-teeth therein, and the movement of products across the hearth are carried out by rectilinear moving pushing elements, which are located beneath the hearth. In other furnace systems, the rotational movement of the products are carried out by relative movement of movable portions of the hearth.

The existing furnace systems have not been satisfactory because they contain at least one of the following drawbacks:

(1) The amplitude of the rotational movements of the products are not positively controlled thus the different faces of the products are not sequentially and regularly presented to the heat source.

(2) The products are not repositioned on the hearth after each rotational movement thus products which do not have a regular geometrical shape quickly deviate from the preferred position which they must have in order to obtain uniform heating.

(3) The rotational and forward movements of the products are not carried out through an orderly method.

(4) The rotation of the products is achieved by gravity by allowing the products to fall on the hearth thereby creating the obvious disadvantage of the hearth is subject to rapid deterioration.

It would perhaps be advantageous to define several terms to be used throughout the present specification as follows:

*Product.*—any material to be heated, cooled or maintained at an even temperature. The product may have a general shape closely approaching that of a prism or a cylinder without the surfaces being necessarily regular or parallel and without the edges or generally longitudinal lines being necessarily parallel. Examples of products might include tubes, rounds, billets, ingots, slabs, and plates.

*Thermic appliances.*—an appliance for carrying out the thermal process of heating or cooling. The appliance need be capable of attaining only those temperatures suitable for the product to be processed therein.

*Continuous thermic appliance.*—an appliance of the above mentioned type having an enclosed production line throughout its whole or portion of its length and allowing for continuous forward movement and treatment of products along said line.

Means by which the foregoing objects and other advantages, which will be apparent to those skilled in the art, are accomplished as set forth in the following specification and claims, and are illustrated in the accompanying drawings dealing with a basic embodiment of the present invention. Reference is made now to the drawings in which:

Figures 1, 2, 3, 4, 5, 6, 7, 8:
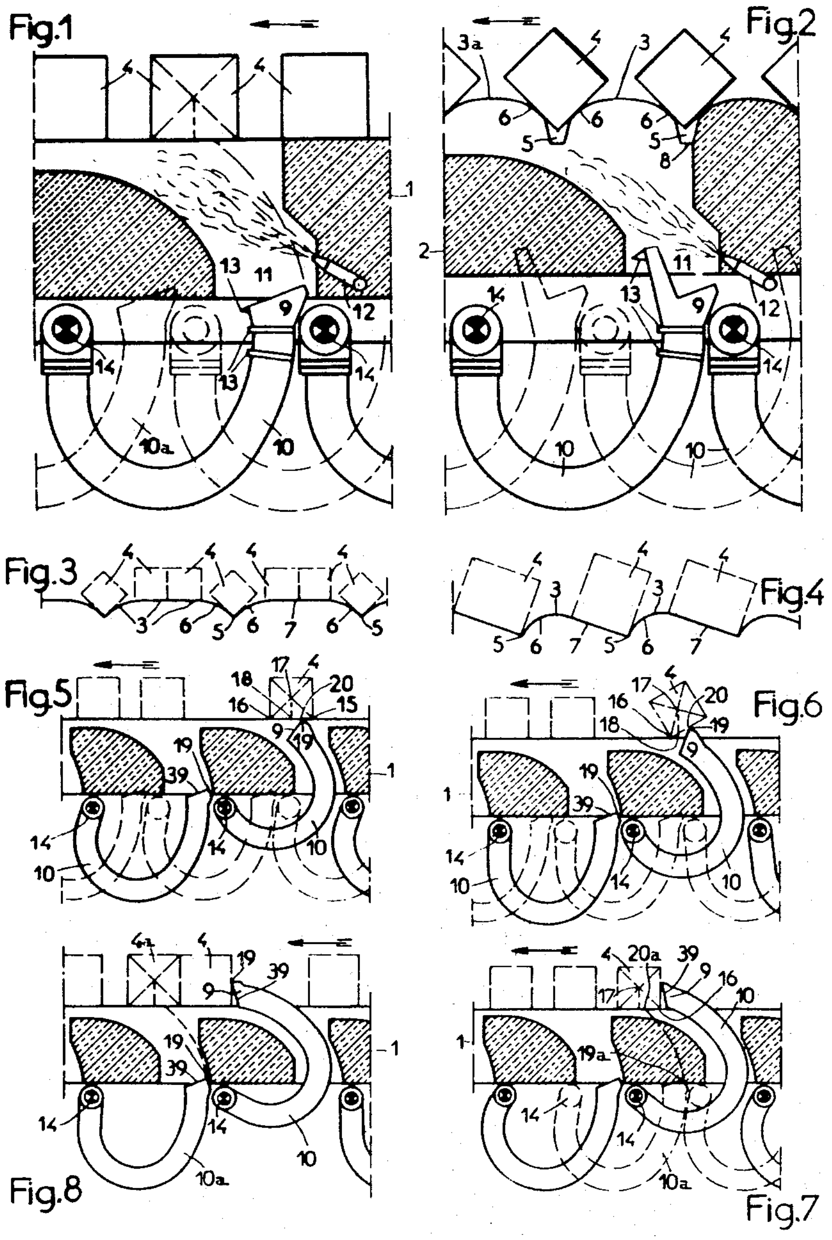
FIGURES 1–4 are vertical longitudinal sections taken through vertical planes parallel to the forward movement of products in thermic appliances having planar and scalloped hearths and employing the subject invention.
FIGURES 5–39 illustrate, in vertical and longitudinal sections, the relative movement of various embodiments of the invention in carrying out the desired movement of the products on planar and scalloped hearths.

Referring now to the figures, FIGURE 1 illustrates one embodiment of the invention being used with a hearth 1 which has a substantially planar surface. FIGURES 2, 3 and 4 illustrate the use of the invention with a hearth 2, the upper surface of which has a profile in the shape of a scallop. The profile of the scallop 3 comprises curve 6 with notches 5 on each side. Each curve is concave in relation to the working surface of the hearth. The profile of the scallops 3 may incorporate mid-portions 7 between the curves 6. These mid-portions 7 have planar surfaces and which are of such a shape that they do not hinder the forward movement of the products. The curves 6 may incorporate a straight portion to enhance the support of the product 4. The lengths of the curves 6 may be extended for appropriate cases. The curves may vary as far as the extreme case illustrated in FIGURE 4 where one of the curves is practically non-existent. It is not necessary for the profiles of the scallops 3 to present symmetry of shape.

It is not essential that the space between each scallop be constant nor that the profile of the scallops 3 be continuous over the entire breadth of the hearth. The profile of a scallop-shaped hearth may be made up of one or more successive scallops inserted at random between other portions of hearths having a planar or other shape. FIGURE 2 illustrates an embodiment of the hearth wherein the inner section of the curves of each scallop are provided with a notch 5. This notch can be so arranged so as to have a channel 8 deep enough to collect waste material such as scale, slag, etc., which may arise from the manipulation of the products 4 and from the wearing of the hearth material.

In accordance with the invention, mechanical actuating members 10 (FIGURES 1 and 2) are generally arranged beneath the hearth so that in their at-rest position they will lie substantially outside the thermic appliance. The members 10 have end portions 9 for transmitting to the products 4 an impetus appropriate to the profiles of the upper surface of the hearth and to the dimensions and densities of the products involved so as to produce the desired forward and rotational movement of the products 4. For this purpose, the end portions 9 of the members 10 are introduced to the working chamber of the thermic appliance through holes 11 arranged in the planar hearth 1 or scallop hearth 2 at the point where it is necessary to manipulate the products 4. Several mechanical members may be provided to act simultaneously or successively on one and the same product. Well known means for coordinating the members in operation may be provided when necessary. The members 10 may take a great variety of sizes and shapes and may move in different planes, all such variables being determined by the size and shape of the products involved.

The thermic conditions required for bringing the products 4 to the required temperature may be satisfied by providing for the following:

(1) That the mechanical members 10 may be heated or cooled internally, e.g. by electrical resistances, water, or vapor circulation, evaporation of freezing fluid, etc.; and (2) The positive or negative sources of heat 12, e.g. screens of flame, jets of carbonic snow, etc., may be used to compensate for thermal wastages which may arise owing to the openings 11.

The mechanical members 10 may be fitted with scrapping knives 13. The knives 13 will automatically effect a cleaning of the opening 11 with each actuation. The mechanical members 10 may also be fitted, in relation to their axis of articulation 14, with means for quick mounting and dismantling devices (not shown), e.g. by sleeve and set screw, by flange, coupling flange, by half shell, by clamping and nuts or by other similar devices.

The products 4 are illustrated as having a transverse section which takes the general shape of a square or a rectangle. When flat hearths 1 are employed, as in FIGURES 1 and 5–9, the products pass from a first position, determined in relation to the mechanical member to a second position, determined in relation to the next successive mechanical member. The first member imparts a rotational and forward movement to the product 4 moving it to corresponding position in relation to the next successive mechanical member 10 which will, in turn, effect the next succeeding rotation. A rotation of about 90° to 180° will be achieved when a scalloped-shaped hearth (FIGURES 2–4) is employed. The additional rotation will clearly be caused by the relation of one scallop 3 to the following scallop **3*a***.

The operation of the invention, associated with the movement of a product on a substantially planar hearth will now be discussed with reference to FIGURES 5 to 9. Referring to FIGURE 5, a product 4 rests in an initial position on a hearth 1 with the surface of the product in contact with the hearth being defined by the edges 15 and 16. The edge 15 is situated towards the product charging side of the thermal appliance and the edge 16 is situated towards the discharge side. The center of gravity of the product has been indicated by the reference numeral 17. Reference numeral 18 represents a plane perpendicular to the surface of the hearth which, at this point, is substantially centered between edges 15 and 16 and passes through the center of gravity. The product 4 has reached this initial working position through normal charging of the thermic appliance. In order to achieve a forward, rotational movement of the product 4 about edge 16, point 19 of the end portion 9 of member 10 comes into contact with the product 4 at point 20 (see FIGURE 5). The contact point 20 is located between the perpendicular 18 and edge 15.

FIGURE 6 illustrates the commencement of a forward, rotational motion of the product 4. The point 19 must follow a substantially arcuate path with a center at edge 16 and a radius of the distance between 16 and 19. During rotation of the product, contact point 20 must always be situated on the product charging side of the product relative to a perpendicular plane 18 passing through the center of gravity 17. During rotation of the product, the perpendicular plane 18 approaches edge 16 until it finally is located at substantially the same position. In the course of this movement, the center of gravity will finally move beyond the relative position of the edge 16 and the mass of the product 4 will continue the rotation of its own accord until such time as it rests with its next successive side fully contacting the hearth 1.

Referring now to FIGURE 7, in order that the product will effect a further rotational and forward movement along the hearth 1, it is necessary that before the beginning of this next movement, product 4 be properly positioned relative to the next successive mechanical member **10*a* which is to effect the next successive rotation of the product. Member 10*a* has been illustrated in broken lines and may be considered as lying in a different vertical plane than member 10. As before, the point 19*a* of the member 10*a* makes contact with point 20*a* of the product 4. Contact point 20*a*, like contact point 20, is situated towards the charging side of the product 4 relative to the perpendicular plane 18 passing through the center of gravity 17. The rotational movement effected by member 10*a* will further rotate and position the product 4 to the position illustrated in FIGURE 8 where product 4*a* is clearly in position for the next mechanical member 10*b*** to perform the next sequential operation.

The product 4 may be further positioned following a rotational movement by member 10 by one of the following means:

(1) By causing the product 4 to be moved forward by the end portion 9 of the member 10, the end portion having thereon a curve which is substantially parallel to the general direction of the forward motion of the product.

(2) By limiting the travel of the end portion 9 of the member 10 immediately upon positioning of the product 4, for example, by predetermining the distance of the travel if necessary with regard to the dimensions of the product 4.

(3) By installing, at the level of the members such as **10*a*, a detector of any known type for recording the position of the product 4 and thereby controlling the backward return of the members 10 immediately following the desired positioning of the product 4. For products of approximately equal dimensions the distance between the contact point 20 and the edge 16 may be kept constant to make the travel of the mechanical members 10 which position the products 4 on the hearth 1** constant.

All forward movements of the products are not necessarily accompanied by a movement of rotation. As illustrated in FIGURE 8, forward motion may be carried out as the products, such as 4, **4*a*, etc., take up their position one following the other. Each product 4 pushes forward the preceding product 4*a* under the action of the member 10 which has just carried out the last rotational movement. The travel of member 10 is limited by means similar to those mentioned in relation to the operation illustrated in FIGURE 7 so that the first product in a series is located exactly in position relative to the next successive member 10*b*** which is to accomplish the following rotational movement.

Figures 9, 10, 11, 12, 13, 14, 15, 16:
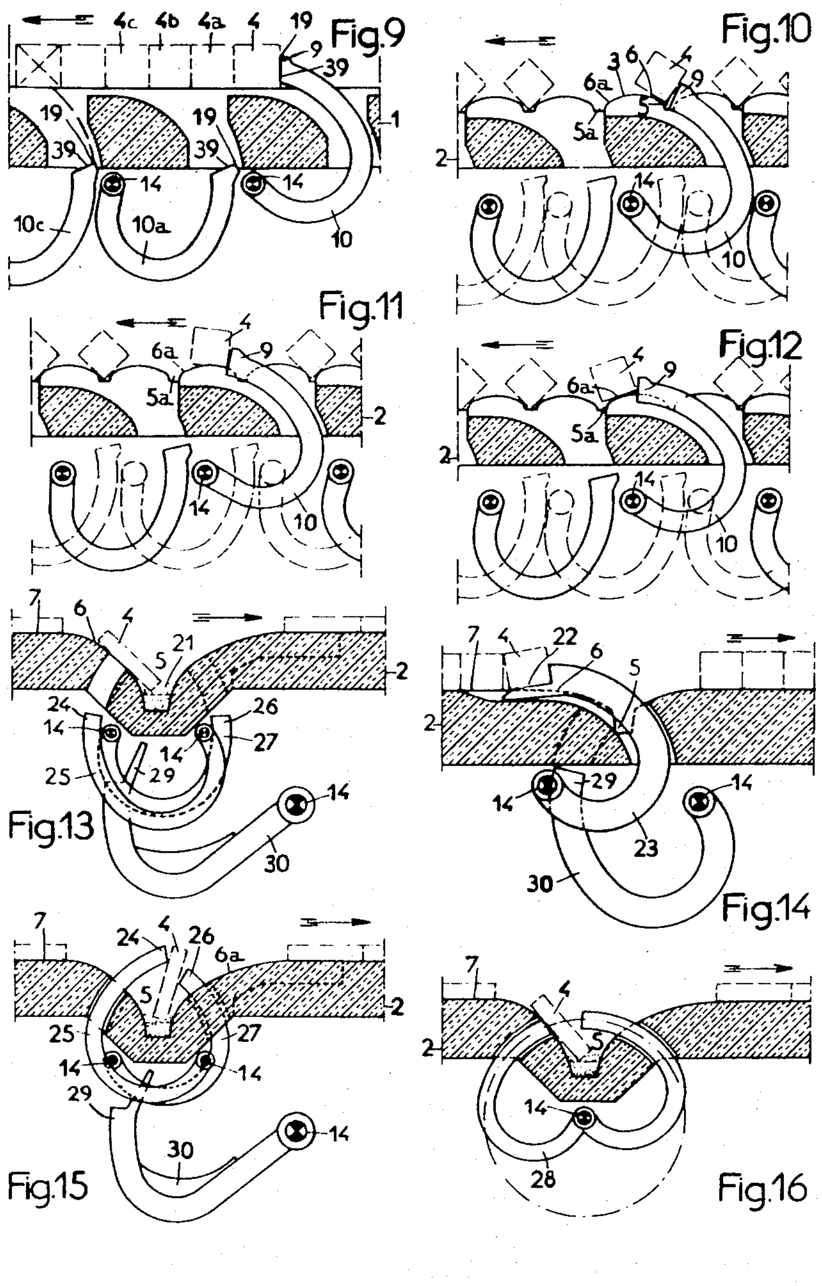
Figure 17:
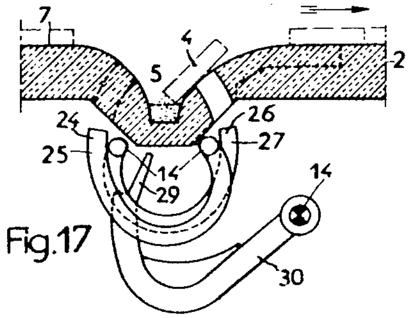
Figure 18:
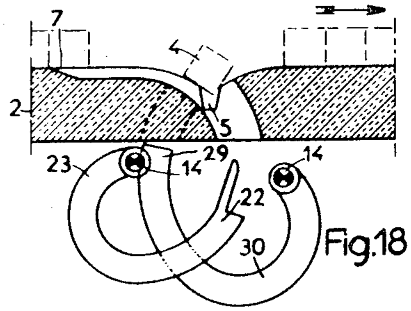
Figure 19:
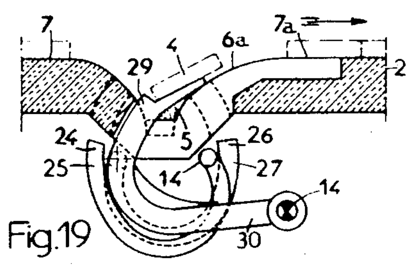
Figure 20:
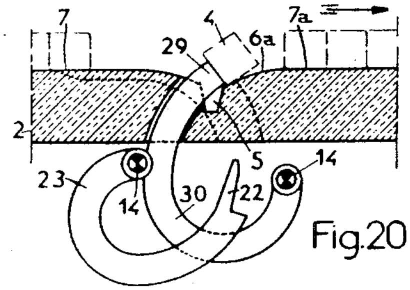

The number of rotations of the products 4 can be intentionally reduced as illustrated in FIGURE 9. All that is necessary to accomplish a reduction in a number of rotations would be to disable alternate mechanical members 10*b*. Thus, the product 4 continues its forward motion along the hearth 1 on the strength of the impetus imparted by the member 10 which has accomplished the initial rotation.

The operation of the invention on a hearth having scallops therein will now be described with reference to FIGURES 10, 11 and 12. The end portion 9 of the member 10 starts from the notch 5 (previously mentioned in the discussion of FIGURE 2) and moves into contact with one surface of product 4. The initial portion of the rotation of product 4 is carried out by a sliding and rolling movement on the curved surface 6 which forms a portion of the scallop following the notch 5. Under the action of end portion 9 of member 10, the rotation is continued while the product 4 is moved forward across the scallop (as illustrated in FIGURE 11). The end portion 9 of the member 10, the travel of which is limited and predetermined if necessary by reference to the cross-section of the product 4, pushes the product forward until the last portion of the rotation takes place due to the curved surface 6*a*. Surface 6*a* is towards the rear portion of the scallop 3 and the front portion of the next successive notch, here noted as 5*a*. In order that the movement of the products (as illustrated in FIGURES 10–12) may be carried out, it is necessary that the end portion 9 of member 10 elevate the product 4. That is to say, the members 10 must follow a path substantially concentric with the profile of the scallop 3 or at least that the path of member 10 cross the curved surface of the scallop on a level with the portions situated at the side of the notches 5 so as to insure the rotation of approximately 90° for square products or rectangular products.

Turning now to a detailed description of the various phases of movement of a product 4 across a scallop-shaped hearth 2, starting from the product charge to the discharge portion of the thermic device, reference is made to FIGURES 13–24 wherein each scallop has a mid-portion 7 on which the product 4 is rested. It is important to note that the direction of motion illustrated in these figures is the reverse of the motion illustrated in the first twelve figures.

Referring first to FIGURE 13, from the end of a mid-portion 7, product 4 slides into the notch 5 while effecting a partial rotation due mainly to the curved surface of the scallop 6 preceding the notch 5. This motion generally follows a movement concentric with the curved surface and brought about by the impetence imparted to the product 4 by the preceding mechanical member (not shown) acting in the preceding notch (also not shown). The impulse is transmitted to the product 4, and to those of any which follow it on the mid-portion 7, by a product being rotated and lodged on the beginning of mid-portion 7. In order to damp the movement acquired by the product 4 on its arrival in the notch 5, the base of notches 5 may be stuffed with a finely granulated substance 21, such as granulated cork, silicon sand, granulated magnesium, coke dust or other similar substances.

FIGURE 14 illustrates an alternative embodiment of the invention wherein the product 4 resting on a mid-portion 7 is moved by sliding underneath the product a carrying surface 22 of the mechanical member 23. Member 23, through its motion, elevates, rotates and deposits the product 4 in the notch 5. For this embodiment, it is necessary that the end portion of the mechanical member 23 follow a path substantially concentric with the curved surface 6.

FIGURE 15 refers again to the embodiment illustrated in FIGURE 13 and shows the product 4 resting in the notch 5. Member 25 imparts a rotational movement to the product 4. The axis of rotation of the product is about the surface resting in the base of the notch 5. As a result of the impetus thus imparted to the product 4, it tips its own mass coming to rest against the curved surface 6*a* of the next successive scallop. To eliminate an impact force against the curved portion 6*a*, an additional mechanical member 27 having an end portion 26 may be provided. The end portion 26 passes through the curved surface 6*a* a distance into the notch 5 sufficient to receive the product 4 at the moment it commences to fall of its own mass. Preferably the end portions 24 and 26 of members 25 and 27 respectively follow paths which are tangential at the point of contact to the rotation of the product.

FIGURE 16 illustrates another alternate embodiment of the invention wherein the members 25 and 27 are replaced by a single member 28 in the form of a two-pronged fork. The prongs of the fork are not necessarily rectilinear and may take any of a variety of suitable shapes.

FIGURES 17 to 20 illustrate the product 4 at rest in the base of the notch 5. Under the action of the end portion 29 of the member 30, products 4 are moved out of the notch 5 with a rotational movement accompanied by sliding over the curved surface 6*a*. The end portions 29 of members 30 push forward, and if necessary, carry the product 4 while following a path substantially concentric to the curved surface of the scallop 6*a*. At the very least, these paths cross thhe curve 6*a* on a level with the notch 5 and, if necessary, cross the intermediate portion 7*a*, which follows the curve 6*a*, to the lodging point of the product 4.

Figure 21:
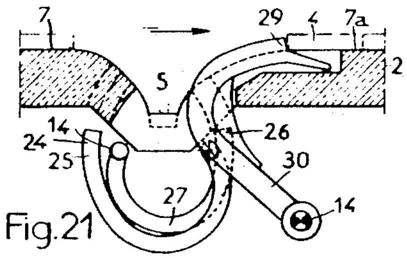
Figure 22:
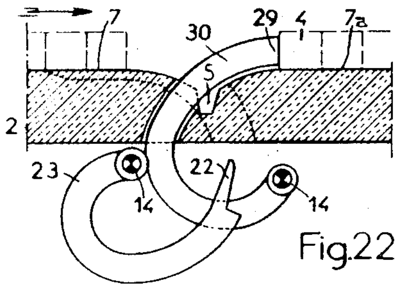

FIGURES 21 and 22 illustrate the product 4 after it has been lodged on the next successive mid-portion 7*a* and immediately before the termination of the movement of the member 30. Product 4 comes into contact with the products previously lodged on the mid-portion 7*a* and imparts to them an impetus causing them to slide forward in the direction of the next successive notch (not shown). It is sufficient for the end portions 29 of the members 30 to follow, at the moment of lodging products 4, a path the tangent of which is substantially parallel to the surface constituted by the mid-portion 7*a*. At the end of this motion, product 4 will have effected, during the various phases of rotation, a total rotation of approximately 90° in the cases illustrated in FIGURES 14, 18, 20 and 22, and the total rotation of approximately 180° in the case illustrated in FIGURES 13, 15, 16, 17, 19 and 21.

Figure 23:
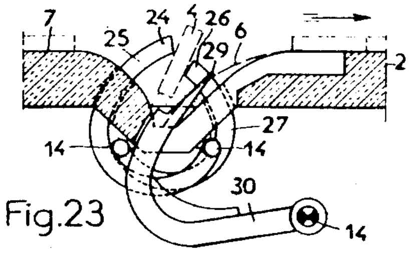
Figure 24:
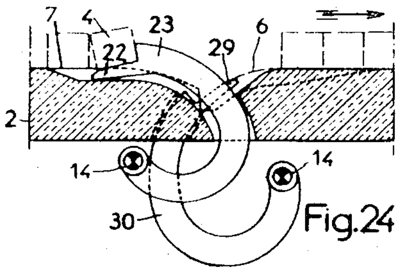

FIGURES 23 and 24 illustrate an alternate embodiment wherein at the end of phases of movement illustrated in FIGURES 14 and 15, the product is lodged directly on the end portions 29 of the members 30.

Figure 25:
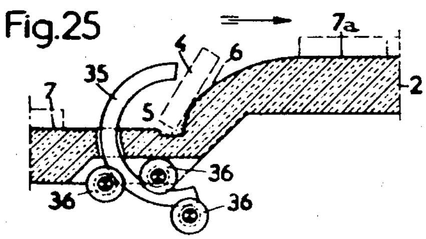
Figure 26:
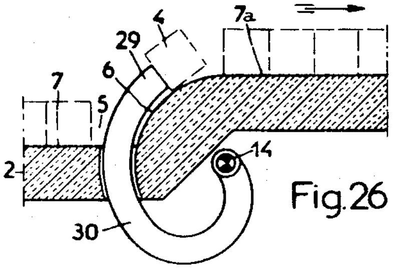

FIGURES 25 and 26 illustrate an embodiment wherein one of the curves 6 has been extended in length so as to become a very slight or practically non-existent (also illustrated in FIGURE 4) curve. In the two embodiments illustrated in these figures, the product 4 is elevated up the scallop to a new level as well as rotated and moved forward.

Figure 27:
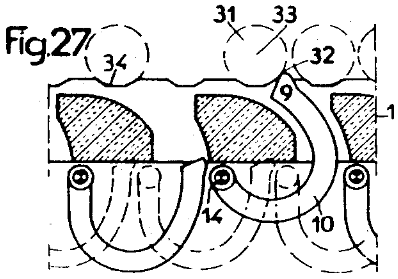

For products having a cross-section of something other than a square or rectangle, an embodiment is illustrated in FIGURE 27 with the direction of movement towards the left. The rotation and the angle of rotation is made to depend on the shape of the transverse section of the products. For example, under the action of the member 10, of the same type as previously described, round products 31 are moved through an angle which, in part, is related to the diameter of the cross-section of the product 31. During the movement, the point of contact 32, of the members 10 on the product 31, must be located on the charging side of the product in relation to a vertical plane passing through the axis 33 of the product 31. Preferably indentations 34 are arranged in the surface of the hearth at the points of rest of the product.

FIGURES 5–15, 17–24, 26 and 27 illustrate various paths of end portions 9, 22, 24, 26, and 29 of the members 10, 23, 25, 27, and 30 respectively as they are moved by various standard mechanical means. In particular, the most simple means is articulation of the members about an axle 14 generally situated beneath the hearth of the thermic appliance. In the embodiment of each figure, a geometric study allows for the appropriate location of the center of articulation of the aforementioned members so as to obtain the desired paths.

Figure 28:
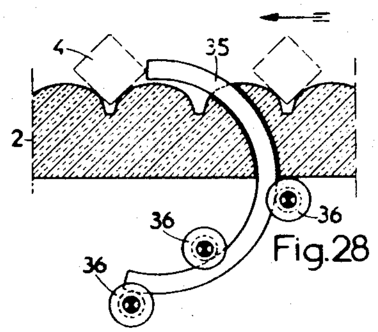
Figure 29:
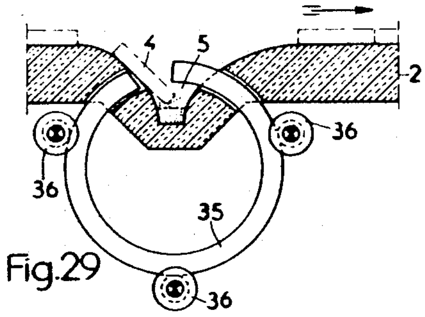

FIGURES 25, 28 and 29 illustrate a further alternate embodiment of the invention wherein the desired path may be obtained by giving the members 35 the shape of part of a torus held and guided by roller means 36 and being located outside the thermic appliance. The members 35 and at least one of the rollers 36 may be fitted with the gearing teeth so that the movement of the product is carried out under the best conditions of positive drive. The products may be carried for part of their travel by the end of the manipulating members, which in this embodiment are preferably arranged to form a dihedral angle. The products are positioned on the hearth by suitable mechanical means which are capable of putting into operation, the effects of inertia, impact, gravity, or by arranging, in the control mechanism of the manipulating members, means which allow the product carrying portion of the member to be removed to a position beneath the upper surface of the hearth of that portion of the member which carries the product.

Figure 30:
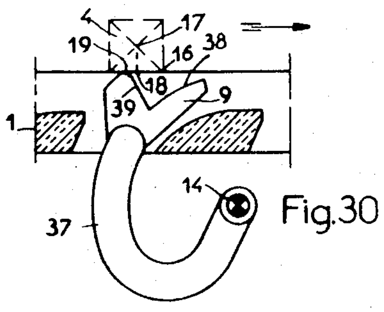
Figure 31:
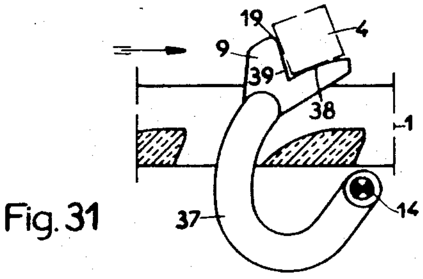
Figure 32:
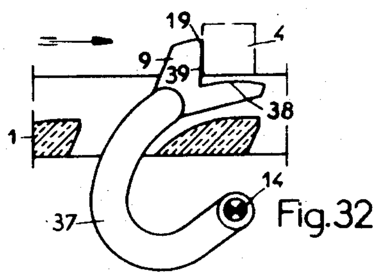

Still another embodiment of the invention is illustrated in FIGURES 30–32. On a flat hearth 1, under the same conditions as those previously explained in reference to FIGURES 5 and 6, a product 4 makes a rotation about an edge 16, under the joint action of the movement of rotation of member 37 about axle 14 and of the lifting movement of the axle 14 executed simultaneously or consecutively.

The orientation and amplitude given to the dihedral angle formed by the ends of the members 37 are such that the surface 38 of the dihedral angle, which are to carry the product 4, come to rest in a position between the product 4 and the hearth 1 to receive the product 4 when the member continues the movememnt of rotation of the product 4 about the edge 16 under the effect of gravity. At this point, the surface 38 of the member 37 has received the product 4 as illustrated in FIGURE 31. Following a downward motion of the axle 14, the surface 38 is removed beneath the upper surface of the hearth 1 and the product 4 is deposited upon the hearth as indicated in FIGURE 32.

In the case of a flat hearth, the working surface 39 of the end portion of the member 10 or 37 incorporating point 19 (FIGURES 5–9, and 30–32) should be preferably oriented in such a way that:

(1) At the moment when end portions 19 make contact with the product 4 (FIGURES 5 and 30) all points on the surfaces 39 below a plane passing through the point 19 of the product 4 form an angle of about 45° with the surface of the hearth.

(2) During the final of the movement when a product 4 is effecting a transfer movement, the surfaces 39 are substantially parallel to the lateral surfaces of the product 4 which, at that moment, are perpendicular to the surface of the hearth 1 (FIGURES 7 and 32).

Figure 33:
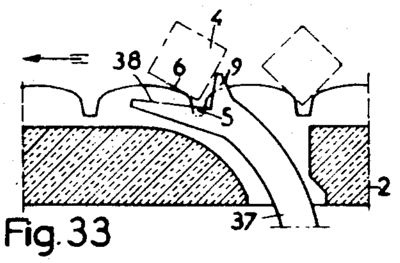
Figure 35:
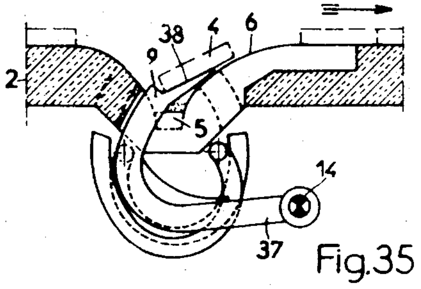
Figure 34:
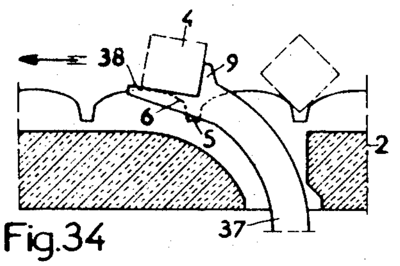

In the case of scalloped-shaped hearths (FIGURES 33, 34 and 35) the ends of members 37, in the form of dihedral angles, are positioned beneath and perpendicular to the product 4. By rotation of the members 37, under the same conditions explained in the case of FIGURES 10, 19 and 20, while effecting a rotation about the concave surface 6, the product 4 is moved by the carrying surface 38 of the member 37 and leaves contact with the profile of the scallop.

During rotation of the member 37 (referring to FIGURE 36), the product 4 is presented at right angles to its position of deposition above the concave curve 6a located before the notch 5a which follows the notch 5. The travel of the end portion of the member 37 is predetermined with regard to the transverse section of the product 4.

Figure 39:
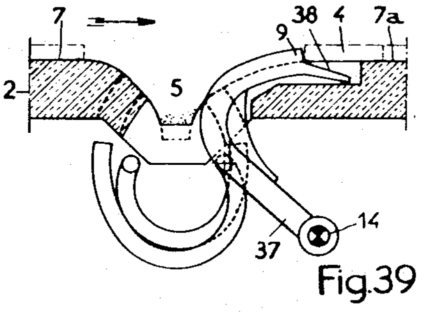

During rotation of member 37 (FIGURE 37), the product 4 is presented at right angles to its position of deposition above the mid-portion 7a which follows the notch 5. Following the downward displacement of the axle 14 (referring to FIGURES 38 and 39) the supporting surfaces 38 of member 37 are removed to beneath the upper surface of the hearth 2 and thus deposit the product 4 either in the notch 5 or on the midportion 7a.

It will be noted that when the products are moved forward during a portion of their travel by the manipulation members it is not necessary for the corresponding portion of the hearth to have scallop profile. In fact, the members follow, during movement of the product, the profile of the scallop 6 thereby obviating the need for a complete scallop. The various paths of the end portions of members 37 (referring to FIGURES 30–39), which allow taking charge of a product 4 and the removal to beneath the hearth at the moment of depositing a product 4 of the carrying surface 38 of the members, may be achieved by any of the well known mechanical means. For example, the simplest means would be to have the members 37 articulated about axle 14 by making use of mechanical devices which allow for the displacement of the axles vertically at the moment of contact with the product 4 and at the moment of depositing the product 4.

Figure 37:
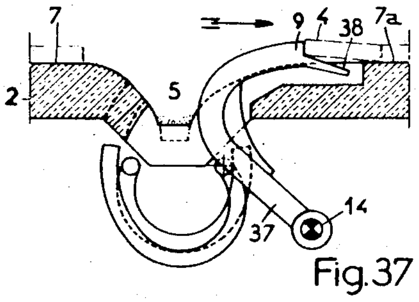
Figure 36:
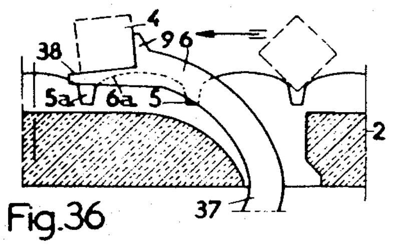
Figure 38:
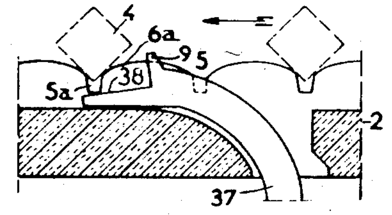
Figure 40:
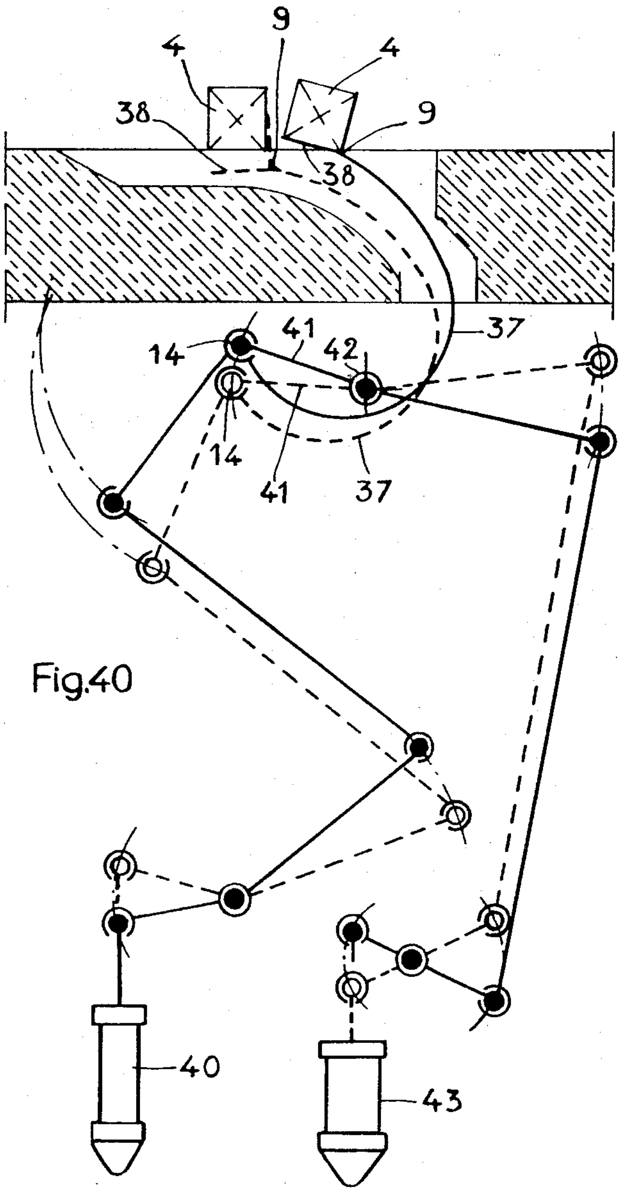
FIGURE 40 illustrates a schematic diagram of one embodiment of the subject invention.

FIGURE 40 illustrates diagrammatically a mechanical actuating means which may be used for either flat or scallop-shaped hearths. Members 37 pivot about axles 14 under the action of a moving jack 40 through the medium of rods, shafts and cranks. The axle 14 is supported at a crank end 41 which is articulated about an axle 42. Axle 42 is under the control of a moving jack 43 through a medium of rod, shafts, and cranks. In connection with the embodiments illustrated in FIGURES 30–40, there will be described, by way of example, the kinematics of movement of members 37. In order to penetrate into hearths 1 or 2, the members 37 pivot about axle 14, until a moment when the ends of members 37 are positioned beneath the product 4. During the next portion of the movement of the member 37, the end portion 9, and in particular the point 19 in contact with the product 4, follows a path which causes the rotation of product 4 in accordance with the conditions explained in reference to FIGURES 5 and 6 and FIGURES 10–12. When the carrying surfaces 38 of the end portions of members 37 are positioned under the product 4, the axles 14 are vertically displaced towards the hearth. A joint rotational movement of the members may also be imparted through the axles at this time. The product 4 is lifted and controlled (FIGURES 30, 33, 35 and 40) while effecting a movement of rotation under the same conditions as those explained for FIGURES 6, 10, 19 and 20. The FIGURES 30, 33, 34, 35 and 40 illustrate the product 4 under this control. Thereafter members 37 continue their movement of rotation about axle 14 until the moment when the products 4 are placed at right angles to their positions of lodging on the next scallop or level (FIGURES 36, 37 and 40). At this moment, the axles 14 move vertically away from the hearth. Thus the surfaces 38 are removed to beneath the hearth 1 or 2 depositing the products 4 on the hearth (FIGURES 32, 38, 39 and 40). In the case of flat hearths 1, the movement of the rotation of members 37 can be made jointly with the downward displacement of the axles 14 to obtain, after deposit, a transfer movement of the product 4 across the hearth 1. This allows for the proper positioning of product 4 in relation to the manipulating members (not shown) which are due to effect the next sequential rotation.

The relative arrangement and dimensions of rods and cranks for controlling the members 37 and the position and paths of movement of axles 14, as illustrated for example in FIGURE 40, may be determined in such a way that the points on members 37 in contact with the product 40 will generally follow paths designed so that the products 4 will effect the various required movements of transfer and rotation.

Figure 41:
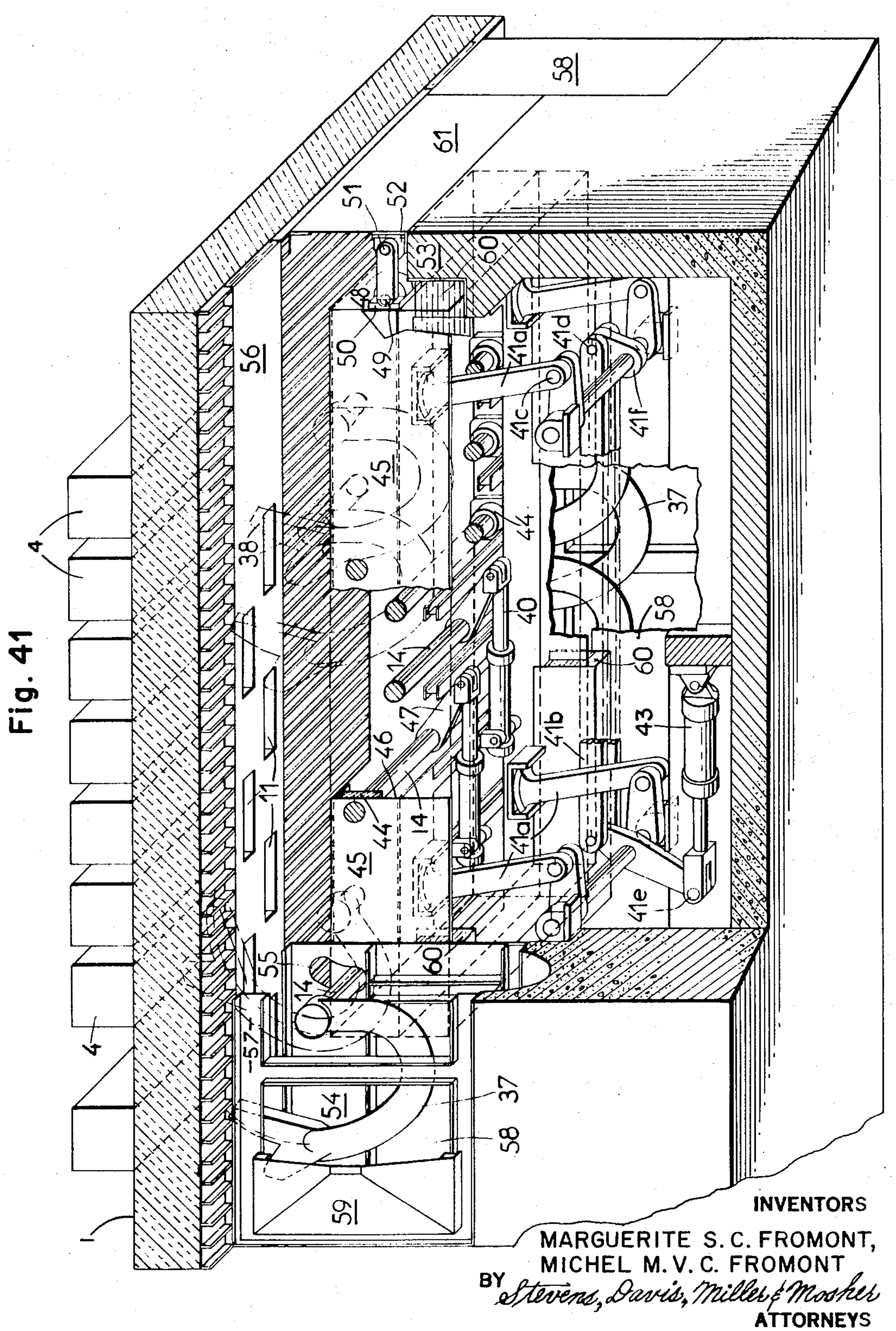
FIGURE 41 illustrates a perspective view of the invention and the means for operating said invention; and, FIGURE 42 illustrates in transverse sections one embodiment of the invention which can be used when it is desired to obtain a gas tight enclosed space within the thermic appliance.

The movements of the members 37 may be obtained by mechanical means and in particular by supporting the axles 14 by bearings 44 attached to a movable frame 45 (FIGURE 41). The frame 45 is formed mainly of two beams 46 arranged parallel to the forward movement of products 4. The rotating movement of the members 37 may be obtained by means of cranks 47 under the action of moving jacks 40 attached to a support which may, if necessary, be in the frame 45. The lifting movement of member 37 is obtained by the action of a moving jack 43 by means of a mechanical connection made up of connecting rods, axles, and cranks 41*a*, 41*b*, 41*c*, 41*d*, 41*e* and 41*f*. This mechanical connection is well known and is commonly used for the lifting mechanism of beams which effect forward movement of products by the system known as "walking beam." Connecting rods 48 are articulated at about axles 49 supported by bearings 50 contained within the frame 45 and about an axle 51 supported by bearings 52 contiguous with a fixed support 53. The connecting rods 48 guide the frame 45 during the various movements. The frame 45 slides freely between beams 54 which support the hearth of the thermic appliance. Slots 55 are arranged in the center of beams 54 to allow for the displacement of the axles 14.

If gas tightness of the closed space of the thermic appliance is desired, various means may be employed, among them being:

(1) On both sides of the orifices 11, provided for the passage of the members 37, there are arranged a sheeting 56 which, if necessary, is cooled by refrigerating fluid, thereby insuring a continuous tight joint between the supporting beams 54 and the supporting beams 57.

(2) Continuous tight casings 58 are arranged at each side of the frame 45 around the entire assembly of the various members 37 and preferably perpendicular to the beams 54 and 57. The longitudinal and vertical surfaces of the casing 58 most distant from the frame 45 can be arranged to contain inspection doors 59 which are hermetically sealed and which will allow access to the manipulating members 37.

(3) The frame 45 may be constructed in the form of a continuous tight bell the edges of which are immersed in a liquid sealing ring 60 of predetermined height to allow for the displacement of the frame 45 without interference with the sealing means while taking into account the level of pressure which may exist in the thermic appliance. The liquid seal 60 insures the continuity and tightness of the space bounded by the internal bell made up of the frame 45 and the outer bell made up of beams 54, the casing 58, and the continuous member between them the cross-beams 61 and the bed-plate of the appliance or any other similar member insuring cross-section between casings 58 and the beams 54.

(4) The aforesaid bearings 44 may be attached by vertical flasks along the beams 46 of the bell frame 45 and if necessary the bearings 44 may be fitted with well known sealing devices (not shown), such as stuffing boxes.

Where the manipulating member 47 does not carry the product 4 during a portion of its movement, the axle 14 need not be displaced and the beams 46 may then be made unitary with the beams 54 which therefore no longer would incorporate slots 55. In order to obtain sealing as tight as demanded, it is sufficient to keep the casings 58 and sheeting 56 surrounding the entire assembly of members 37. On a hearth of scalloped-form 2, in order to position exactly a product 4 (FIGURES 33, 34 and 40) at the moment of its being taken charge of by the surface 38 within the dihedral angle at the end of member 37, the following may be done:

(1) The mechanical impetus applied by the moving jack 40 (FIGURE 40) which control the rotation of the members 37 may be limited in order to eliminate any sliding of the product 4 on the hearth 2.

(2) The manipulating devices may be arranged so that the lifting movements of the members 37 are produced only when the efforts demanded by the movement of rotation are too great to be carried out. The latter may be effected by various means simplest of which are:

(a) By supplying in parallel jacks 40 and 43 at the moment of taking charge of the product 4;

(b) By providing non-return valves on the pipes supplying the jacks with power fluid; and, (c) By dimensioning the jacks 40 and 43 so that each time the product and the member 37 are not in a stop-position in regard to the hearth, the pressure of the supply of power fluid to the jacks 40 controlling the rotation of the member 37 is less than the pressure exerted on the jacks 43 during lifting movements of the axles 14.

Figure 42:
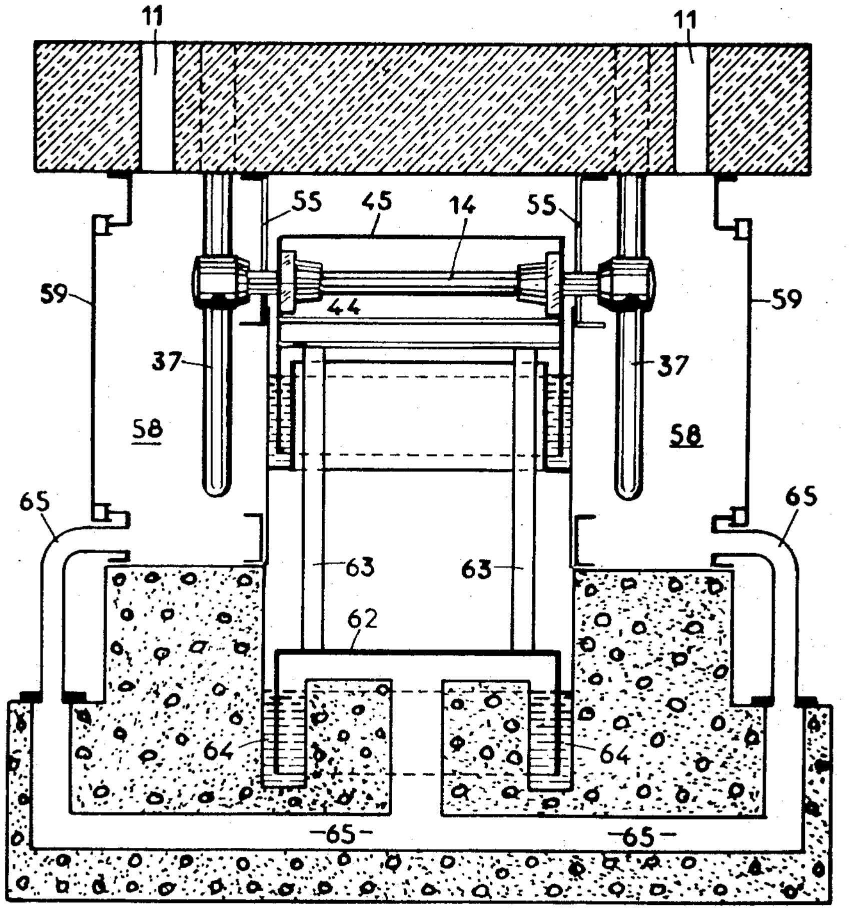

FIGURE 42, in transverse section and like reference numerals, illustrates the main elements which allow for obtaining of an enclosed space in the thermic appliance. Following vertical displacement of the frame bell 45, there are produced, through the holes 11, a gaseous current between the interior of the thermic appliance and the casing 58. The current may entail heat wastage. In order to reduce this wastage to a minimum there may be arranged a sealing bell 62 connected mechanically by tie-members 63 to the frame bell 45. The edges of the bell 62 are immersed in a liquid sealing ring 64. The interior of the bell 62 is in communication with the casing 58 by means of pipes 65. Owing to the tie-members 63, the vertical movements of the bell 62 and the frame 45 are in the same direction and are proportional. The horizontal sections of the bells 45 and 62 and the ratio of the vertical movements of the bells are such that the gaseous volume drawn into or expelled from the casings 58, at the time of movement of frame 45, is equal to the volume of gas expelled from or drawn into the bell 62. This ratio may be obtained in the simplest manner by making the horizontal section of the bells 45 and 62 equal and by rigidly connecting them together to obtain identical vertical movements of the bells.

In all the cases illustrated, in order to effect the various phases of movement of a product 4, it is evident from the relative positions of the path of the end portions of the manipulating members, that the members may have any one of numerous appropriate forms. In order to limit heat wastage it is advantageous to reduce the holes 11 (FIGURES 1 and 2) and for this purpose there is an inducement to provide members of which:

(1) The ends which penetrate the thermic appliance exhibit approximately the shape of a portion of a tori of which the center is located at the center of rotation or at the successive mid-points of the various centers of rotation of the members.

(2) Transverse sections, e.g. of ellipsoidal shape or oval shape, are determined to obtain for the smaller sections inertia which is appropriate to the efforts developed.

These transverse sections are not necessarily identical in every particular and may, for example, be reduced toward the ends of the members which penetrate into the working chamber. In cases where the products are carried by the members, in order to damp the movement of the product at the moment of their being contacted, use may be made of carrying surfaces such as 38 (FIGURE 41) of which the longitudinal profiles are curved with a concavity facing the hearth. Manipulating members, such as have just been defined, may be utilized, in the numerous cases of products being worked in thermic appliances, when it is required to have manipulating members penetrate into the working chamber of the thermic appliance through orifices having the smallest possible sections. Such members may, for example, be utilized as a thrusting mechanism to produce a transfer of the products in the thermic appliance with a flat hearth or scalloped hearth as illustrated in the figures.

The kinematics of the forward movement of products in the thermic appliance will now be explained. Depending on whether the first mechanical agent effecting rotation of the products is preceded or not by a standard hearth, the products are generally positioned in a relation to the first member by means of a standard charging device, e.g. a push mechanism or other device already providing for the forward movement of products in the standard hearth. The rhythm of manipulations is adjusted in relation to the desired industrial process. The ends of the members, after introduction into the working chamber of the thermic appliance, effect a movement allowing for the forward movement and rotation of the products in accordance with the process previously explained in connection with FIGURES 5–40. The movement of the members is such that, by means of return travel identical or otherwise with the outward travel, the members, may be returned to their starting position outside the thermic appliance. With flat hearths or with scallop hearths, the movements of the different sets of members, each individually manipulating the products contained inside the thermic appliance, may be made simultaneously or successively as required by means of a series of impulses. Generally the members follow the other members in order starting from the discharge to the charging end of the thermic appliance. Thus, in every case, with the exception of the hearths of the scallop-shape when the products are pushed into a notch under the action of a member fitted in the preceding notch the products are moved through the thermic appliance. This case of scallop-shaped hearths, the movement of the different sets of members fitted into the one notch can only be carried out after the operation of the various sets of members fitting into the preceding notch. The forward movement of products is not necessarily always made in the same direction and use can be made of a hearth exhibiting, over the whole or part of its surface a shape for example, like that of portions of crowns.

A change of direction in the forward movement of products is generally brought about by establishing, preferably at the moment of transfer movements of products, an angular displacement between the divisions of the various members simultaneously manipulating one and the same product. This displacement can be obtained by causing a variation in the speeds in relation to each other of the respective members.

The invention may be embodied in other specific forms without parting from the spirit or essential characteristics thereof. The present invention is therefore to be considered in all respects illustrative and not restrictive, the scope of the invention being indicated by the appended claims rather than the foregoing description, and all changes which come within the meaning and range of the equivalency of the claims are therefore to be embraced therein.

What is claimed is:

1. A device for obtaining homogeneous treatment of products in a treating zone of a thermic appliance, said thermic appliance comprising a treating zone, a hearth having a plurality of apertures therein and serving as a working surface within said zone, means for respectively charging and discharging products to and from said zone, means to thermally control said zone, said device comprising a plurality of members having one end rotatably on the exterior of said zone reciprocally mounted beneath said hearth adjacent said apertures, said apertures being spaced from each other about said hearth, the smallest transverse section of said apertures being substantially equal to the greatest transverse section of said members penetrating therein, exteriorly mounted actuating means for rotating reciprocally said members so that their free ends penetrate said apertures thereby contacting said products and simultaneously rotating them about their longitudinal axis with controlled amplitude and imparting a controlled forward transitional movement across said hearth towards a discharge side of said zone, said members lying totally outside said zone in a non-actuated condition.

2. A device according to claim 1 wherein said members are arranged across at least a part of said hearth from a charging to a discharging side to impart controlled successive sequential rotational and transitional movements to said products in relation to the transverse section of said products.

3. A device according to claim 1 wherein the upper surface of said hearth forms a planar working surface.

4. A device according to claim 1 wherein the upper surface of said hearth, in longitudinal section, forms a series of scallop shapes having at least an end of a concavity downwardly directed, the portion of said scallop located on each side of the highest point of said scallop having an inclination insufficient to cause said product to slide thereon by gravity.

5. A device according to claim 4 wherein said upper surface of said hearth, in longitudinal section forms a series of scallop shapes in the form of a continuous curve, the portion of said curve located on each side of the highest portion of said scallop having an inclination which is insufficient to cause said product to slide thereon by gravity.

6. A device according to claim 4 wherein said scallop shape contains a flat portion intermediate of the curved end portions.

7. A device according to claim 4 wherein said notches are provided between each said scallop.

8. A device according to claim 7 wherein material to dampen the movement of said products is located in said notches.

9. A device according to claim 2 wherein the movement of a first member positions said product so that a second member may sequentially impart another movement to said product.

10. A device according to claim 1 wherein said members and said apertures have an oval cross-section.

11. A device according to claim 1 wherein said apertures are equipped with thermal sources thereby preventing thermal wastage from said zone.

12. A device according to claim 1 wherein scrapping knives are attached to the free end of said members thereby cleaning said apertures with each actuation.

13. A device according to claim 1 wherein said members are hollow and have internal thermal control means.

14. A device according to claim 1 wherein said members are articulated about axles supported by bearings mounted on an exterior frame of said thermic appliance, said axles imparting to said members movements substantially perpendicular to the surfaces of said hearth, actuating means externally mounted for moving said axles in said bearings and for reciprocally rotating said member so that in cooperation with the moving of said axles in said bearing and reciprocally moving said members, the free ends of said members penetrating said apertures to move said products.

15. A device according to claim 1 wherein said member is in the form of a torus and is guided, directed and actuated by externally mounted roller means.

16. A device according to claim 1 wherein said free ends of said members are in the form of dihedrals, the orientation and amplitude given to the dihedrals being such that, in cooperation with the rotational movements of said members, said dihedrals are able to receive said products when said products turn by gravity and carry said products during a part of the movement of said products.

17. A device according to claim 14 wherein a plurality of said bearings are mounted on an exterior frame of said thermic appliance, said frame being externally mounted and actioned for imparting movements substantially perpendicular to the surface of said hearth and means externally located for imparting simultaneous rotational movement to a plurality of said members so that in cooperation with the movements of said frame the free ends of the plurality of said members contact, move, and rotate simultaneously a plurality of said products.

18. A device according to claim 1 wherein a sealing casing surrounds the thermic appliance and the externally mounted members thereby reducing thermic wastage.

19. A device according to claim 18 wherein said axles and bearings are mounted on a movable external frame and said movable frame is immersed in a liquid sealing ring thereby assuring continuity of sealing during movement of said frame.

20. A device according to claim 1 wherein at least a portion of said free end of said members which penetrate said apertures are in the form of at least a portion of a torus.

21. A device according to claim 19 including a bell, said bell being immersed in said sealing ring, said bell being in communication with the sealed casing and connected to said frame, whereby the volume of gas within the sealed casing is kept constant during movement of said frame to limit movements of waste gas through said apertures.

References Cited

UNITED STATES PATENTS

| | | | |
|---|---|---|---|
| 1,922,888 | 8/1933 | Engelbertz | 263—6 |
| 2,214,234 | 9/1940 | Meyer | 263—6 |
| 3,179,390 | 4/1965 | Boutigny et al. | 263—6 |

FOREIGN PATENTS

| | | |
|---|---|---|
| 501,630 | 4/1920 | France. |
| 593,991 | 5/1959 | Italy. |

FREDERICK L. MATTESON, Jr., *Primary Examiner.*

JOHN J. CAMBY, *Examiner.*

D. A. TAMBURRO, *Assistant Examiner.*